US010645185B2

(12) United States Patent
Baba

(10) Patent No.: US 10,645,185 B2
(45) Date of Patent: May 5, 2020

(54) PROCESSING MANAGEMENT DATA AMONG WEB SERVER, APPLICATION SERVER, AND STORAGE SYSTEM

(71) Applicant: CANON KABUSHIKI KAISHA, Tokyo (JP)

(72) Inventor: Shohei Baba, Nishitokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 15/184,750

(22) Filed: Jun. 16, 2016

(65) Prior Publication Data

US 2016/0373542 A1 Dec. 22, 2016

(30) Foreign Application Priority Data

Jun. 19, 2015 (JP) ................................ 2015-124262

(51) Int. Cl.

*G06F 15/16* (2006.01)
*H04L 29/08* (2006.01)
*H04L 29/06* (2006.01)

(52) U.S. Cl.

CPC .......... *H04L 67/2838* (2013.01); *H04L 67/42* (2013.01)

(58) Field of Classification Search

CPC ........... H04N 1/00244; H04N 1/00474; H04N 1/4413; H04N 2201/3278; H04N 1/00464; H04N 1/00954; H04N 1/32545; H04N 2201/0039; H04N 2201/3205; H04N 2201/3207; H04N 2201/3274; H04L 67/28; H04L 67/06

USPC ........ 709/203, 213, 223, 226, 227; 726/2–5, 726/19, 21, 26–30

See application file for complete search history.

(56) References Cited

U.S. PATENT DOCUMENTS

2008/0162703 A1* 7/2008 Stevens ................... H04L 29/06 709/227
2008/0316537 A1* 12/2008 Morita ................. G06K 9/2063 358/3.28
2009/0172811 A1* 7/2009 Homma ............ H04N 1/00411 726/19

(Continued)

FOREIGN PATENT DOCUMENTS

JP 2014-021854 A 2/2014

*Primary Examiner* — Dustin Nguyen
*Assistant Examiner* — Hao H Nguyen
(74) *Attorney, Agent, or Firm* — Canon U.S.A., Inc. IP Division

(57) ABSTRACT

A management system includes a web server configured to communicate with a plurality of external devices each stores management data of one or more network devices, and an application server configured to process management data stored in a storage system capable of storing data and management data transferred from the web server. In response to the reception of an acquisition request of connection information used for transmitting the management data from the external devices, the web server acquires information indicating a type of the external device based on the content of the acquisition request. The web server creates connection information including information indicating a storage destination of the management data determined by using the acquired information indicating a type of the external device. The web server transmits a response including the created connection information in response to the acquisition request.

13 Claims, 18 Drawing Sheets

(56) References Cited

U.S. PATENT DOCUMENTS

2009/0201550 A1* 8/2009 Ikuno ................. H04N 1/00954 358/1.15
2010/0088416 A1* 4/2010 Kurita ................. H04L 63/0815 709/227
2010/0174775 A1* 7/2010 Saiki ....................... H04L 67/06 709/203
2011/0208809 A1* 8/2011 Ito ...................... H04N 1/00222 709/203
2012/0079081 A1* 3/2012 Parks .................... G06F 3/1204 709/220
2013/0010324 A1* 1/2013 Towata ................... G06F 3/122 358/1.15
2013/0021640 A1* 1/2013 Tamura .............. H04N 1/00217 358/1.14
2013/0055364 A1* 2/2013 Tanji ....................... H04L 69/28 726/5
2013/0110910 A1* 5/2013 Ikeda .................. G06F 16/9574 709/203
2014/0025824 A1* 1/2014 Takahashi ........... H04L 67/1002 709/226
2014/0059652 A1* 2/2014 Choi ..................... H04L 63/123 726/4

* cited by examiner

FIG. 17

VALID PERIOD SETTING INFORMATION

| DATA TYPE | DEFAULT VALID PERIOD | PREVIOUS SETTING OF VALID PERIOD |
|---|---|---|
| COUNTER | 10min | 10min |
| LOG INFORMATION OF JOB | 15min | 10min |
| OTHERS | 10min | 10min |

PROCESSING MANAGEMENT DATA AMONG WEB SERVER, APPLICATION SERVER, AND STORAGE SYSTEM

BACKGROUND OF THE INVENTION

Field of the Invention

The present invention relates to a system for receiving data from a plurality of external devices and managing the received data.

Description of the Related Art

Nowadays, various cloud services are provided as a service that allows a user to use various applications operating on a server provided on the internet. In the cloud service such as Infrastructure as a Service (IaaS) or the Platform as a Service (PaaS), a cloud service vendor provides a system administrator with resources such as a virtual machine and a storage via a network. For example, a plurality of virtual machines and storages operating on a server computer existing in a data center on the internet are provided as the resources. The virtual machines are logical computers in which servers are divided or integrated by a logical unit irrespective of physical configurations through virtualization technology, and the logical computers can operate respectively on independent operating systems. Therefore, the system administrator can establish a system for providing a unique service by using the resources such as the virtual machines and the storages provided by the cloud service vendor.

For example, the system established on the cloud service includes a web server, an application server, and a storage system. Herein, functions of the web server and the application server are realized by a group of virtual machines. The web server communicates with an external device existing outside the system to receive a request therefrom, so that the web server or the application server executes processing according to the request. Further, the web server has a function for receiving data from the external device and transferring the data to the storage system or the application server. The data processed by the application server is stored in a database managed by the storage system. A program for realizing the system and various kinds of data for providing the service are stored in the storage system.

In recent years, with a rapid spread of the cloud service, types and amounts of data handled by the cloud service have been increasing. In such a situation, there has been provided a method for concurrently processing data of greater amounts by efficiently using the resources that constitute the system to distribute a load for receiving or processing data transmitted from the outside.

Japanese Patent Application Laid-Open No. 2014-021854 discusses a technique for causing a plurality of requests with respect to a system established on a cloud service to be distributed to and processed by a plurality of servers that constitutes the system via a load distribution device (load balancer). Herein, in the technique discussed in Japanese Patent Application Laid-Open No. 2014-021854, focusing on the fact that the processing capacity of the load distribution device can be a bottleneck in processing a plurality of requests with respect to the system, a request having a large data size is directly transmitted to the server from a request source without passing through the load distribution device. Through the above technique, a processing load relating to data reception executed by the load distribution device is reduced. When the data is directly transmitted to the server, a request source previously requests the load distribution device for address information such as an internet protocol (IP) address and a host name to identify the server as a transmission destination.

Then, various kinds of data are transmitted to the above-described system established on the cloud service from various kinds of external devices. The data transmitted from the external devices are different not only in a data size but also in a format and/or granularity of data. For example, the format of data may be ZIP format or Extensible Markup Language (XML) format, and the granularity of data refers to a degree of amount of items or units included in the content thereof. A web server or an application server in the system has to execute data processing with a different processing load according to the format and/or the granularity of data. Particularly, there is a case where the web server executes processing of storing data transmitted from the external device in the storage system or processing of transferring data to the application server while taking differences in the format and/or the granularity of data into consideration.

When the technique discussed in Japanese Patent Application Laid-Open No. 2014-021854 is applied to the above system, data having a large size transmitted from the external device can be directly transmitted to the storage system without passing through the web server. With this configuration, the processing load relating to data reception executed by the web server in the system can be reduced.

However, as described above, the data transmitted from various external devices is different not only in a data size but also in a format and granularity of data. Therefore, in the storage system, the data may be managed while differences in the formats and the granularity are not taken into consideration because the data does not pass through the web server. Accordingly, when the application server within the system executes processing by using the data stored in the storage system, there is a risk in which an additional processing load may be applied in comparison to the case where the above-described technique for causing the external device to directly transmit the data to the storage system is not applied thereto.

Further, in the storage system, there is a case where the data is managed while the variations in types of the external devices are not taken into consideration. If the data is managed in such a manner, for example, when a cause of the error occurring in the system has to be analyzed, there is a problem in which a transmission source of data stored in the storage system, which can be the cause of the error, may not be identified easily.

SUMMARY OF THE INVENTION

According to an aspect of the present invention, a management system includes a web server configured to communicate with a plurality of external devices storing management data of one or more network devices, and an application server configured to process management data stored in a storage system capable of storing data and management data transferred from the web server. In the management system, the web server includes a reception unit configured to receive a request or management data from each of the external devices, a transfer unit configured to transfer the management data to the application server in response to reception of the management data by the reception unit, an acquisition unit configured to acquire information indicating a type of the external device based on a content of an acquisition request of connection information used for transmission of the management data, in response to reception of the acquisition request by the reception unit, a creation unit configured to create the connection information including information indicating a storage destination of management data determined by using the information indicating the type of the external device acquired by the acquisition unit, a notification unit configured to notify the application server of the information indicating the storage destination of the management data included in the connection information created by the creation unit, and a response unit configured to transmit a response including the connection information created by the creation unit, in response to the acquisition request. In the management system, the application server includes a processing unit configured to process the management data transferred by the transfer unit and the management data stored in the storage destination described in a content of a notification notified by the notification unit.

Further features of the present invention will become apparent from the following description of exemplary embodiments with reference to the attached drawings.

BRIEF DESCRIPTION OF THE DRAWINGS

FIG. 17 is a table illustrating an example of a valid period storage method of connection information.

DESCRIPTION OF THE EMBODIMENTS

Exemplary embodiments of the present invention will be described with reference to the appended drawings.

An exemplary embodiment of the present invention will be described with reference to the appended drawings.

<Network Configuration of System>

Figure 1:
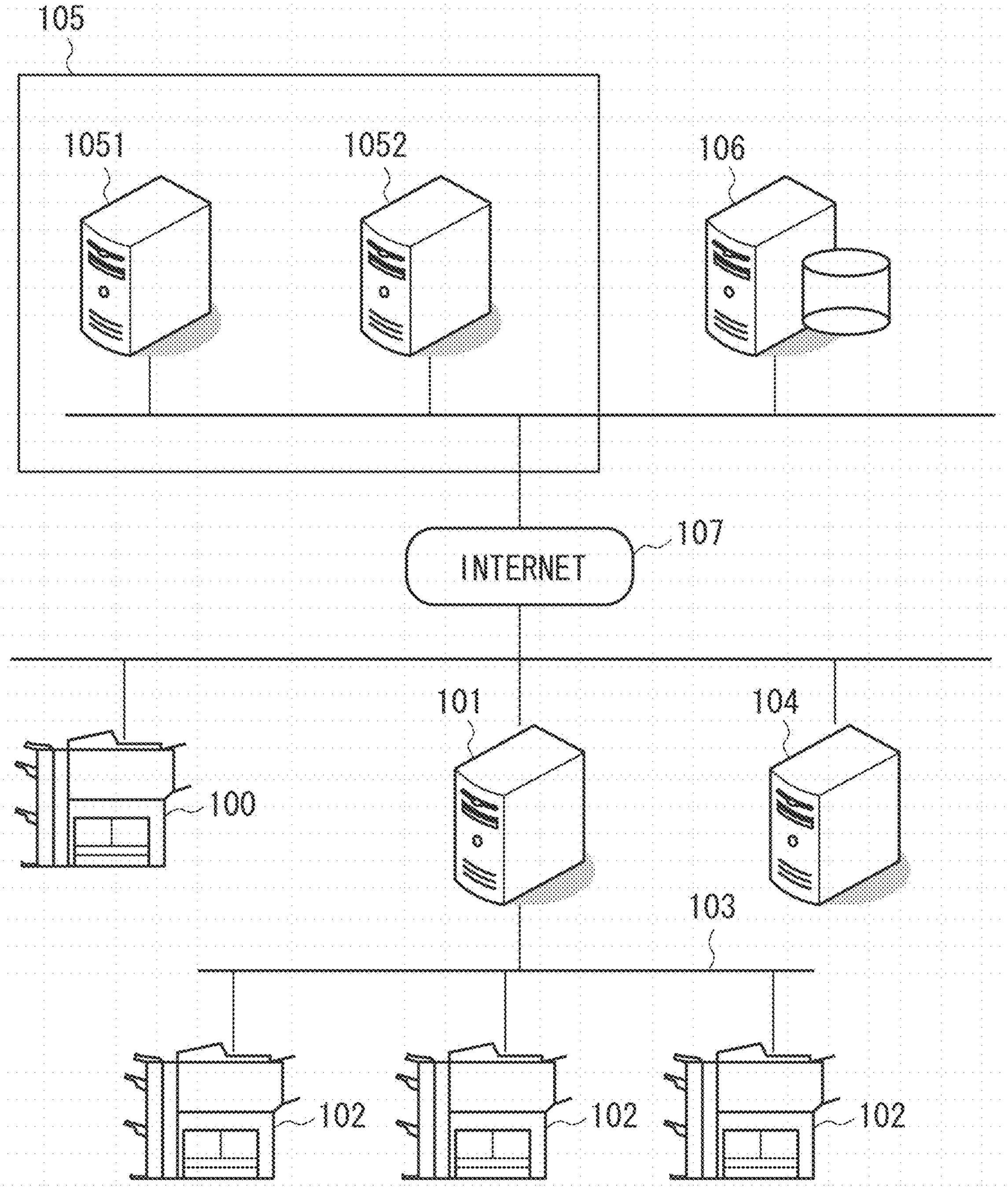
FIG. 1 is a diagram illustrating an example of a network configuration of a system according to an exemplary embodiment of the present invention.

FIG. 1 is a diagram illustrating an example of a network configuration of a system according to a first exemplary embodiment. In the present exemplary embodiment, as an example of the network system established by using a cloud service, description will be given to a system that manages network devices owned by a client or a plurality of clients from a remote place via a network.

Specifically, as an example content of a service, there may be a service of collecting and managing device information of network devices owned by a client in association with the information of that client. Further, there may be a service of making a report to a client or a person in charge of a sales company by collecting and analyzing the operation information such as log information or failure information of a network device of a client. Furthermore, there may be a service of sending an e-mail to notify a person in charge of a sales company of information necessary to perform maintenance work on a malfunctioning network device may be still another content of the service.

In order to provide such services, the system collects, from the network devices existing in a client network environment of each client, and analyzes various kinds of data. Counter information, log information, status information, and device information are examples of the data to be collected. Hereinbelow, the above-described data may be referred to as “management data”. The counter information indicates a use frequency of a function of a network device or the like. The log information indicates a usage history of a network device. The status information indicates a status of a network device such as a normal status or an error status. The device information may be identification information or the like of a network device. The above-described data is transmitted to the system from the external device.

In a configuration illustrated in FIG. 1, a network device 100, a monitoring device 101, and an external server 104 serves as external devices that store various kinds of data of the network devices and transmit the data to the system. In the present exemplary embodiment, although the types of the external devices are as described above, the types thereof are not limited thereto. A format and/or granularity of data transmitted from each of the above-described external devices may be different depending on the type of the external device. Therefore, it is necessary to execute data processing suitable for the format and/or the granularity of data. For example, the format of data may be “ZIP” format, “XML” format, or comma separated value (“CSV”) format, whereas the granularity of data refers to a summarization unit of data such as “per day” or “per month”. Further, the granularity of data may be the number of monitoring items depending on differences in types of the external device.

The network device 100 includes a function for externally transmitting counter information, log information, and/or status information stored thereby via a network such as the internet.

The monitoring device 101 monitors an operational status of the network device 100 installed in the network environment of the client. The monitoring device 101 acquires counter information, log information, and status information from the network device 100 serving as a monitoring target. The monitoring device 101 is connected with a plurality of network devices 102 via a local area network (LAN) 103.

In addition, examples of the network device include an image processing apparatus such as a multi-function printer (MFP), a printer, a network camera, and a digital medical device, and a network home electric appliance such as a television and an air-conditioning apparatus. Further, examples of the network device include a measurement device capable of measuring health data such as a body weight or a blood pressure, and an automated teller machine. The printer may be an electro-photographic printer using toner or an ink-jet printer that executes printing by using ink. The management system 105 can provide different management services by collecting unique operational information (e.g., use amount of toner or ink) according to the type.

The external server 104 acquires various kinds of data from network devices (not illustrated) in an external system to transmit the data to the system.

The management system 105 receives and manages various kinds of management data transmitted from the network device 100, the monitoring device 101, and the external server 104 (hereinafter, these are collectively referred to as "external device"). The management system 105 includes a web server 1051 and an application server 1052. The management system 105 may also include the storage system 106 in addition to the above-described configuration. Further, the web server 1051, the application server 1052, and the storage system 106 may be respectively installed in remote places. Furthermore, the management system 105 may include a plurality of web servers 1051 and a plurality of application servers 1052, and each server may have a configuration such as a load balancer installed in a preceding stage thereof, so that requests can be distributed to and processed by respective servers.

The web server 1051 communicates with the external device and receives data or a request transmitted from the external device, and executes processing thereof. The web server 1051 transfers the received data to the application server 1052. After executing data conversion processing or determination processing for selecting a transfer method according to the data type on the received data as necessary, the web server 1051 transfers the data to the application server 1052. Further, the web server 1051 responds to the request from the external device.

The application server 1052 processes data transferred from the web server 1051. According to a notification from the web server 1051, the application server 1052 acquires and processes data stored in the storage system 106. For example, the application server 1052 executes processing such as data format conversion. Through the above-described processing, an operational status of the network device is output as a report, so that a reporting service is provided to the client. In addition, batch processing for summarizing various kinds of data is included in the processing executed by the application server 1052.

The storage system 106 can store data transmitted from the application server 1052 and the external device. The storage system 106 may store data directly transmitted from the external device.

Each of the web server 1051, the application server 1052, and the storage system 106 is configured of one or more virtual machines operating on one or more server computers. The system according to the present exemplary embodiment is configured of the web server 1051, the application server 1052, and the storage system 106, and established on the cloud service.

Further, the external device is connected to the web server 1051, the application server 1052, and the storage system 106 via the Internet 107.

The external device may be disposed on the external network via the Internet 107, so that the network device 100 and the external device may be connected to each other via the Internet 107. Further, the external device and the management system 105 can be connected to each other through the Intranet via the LAN 103.

<Internal Configuration of Information Processing Apparatus>

Figure 2:
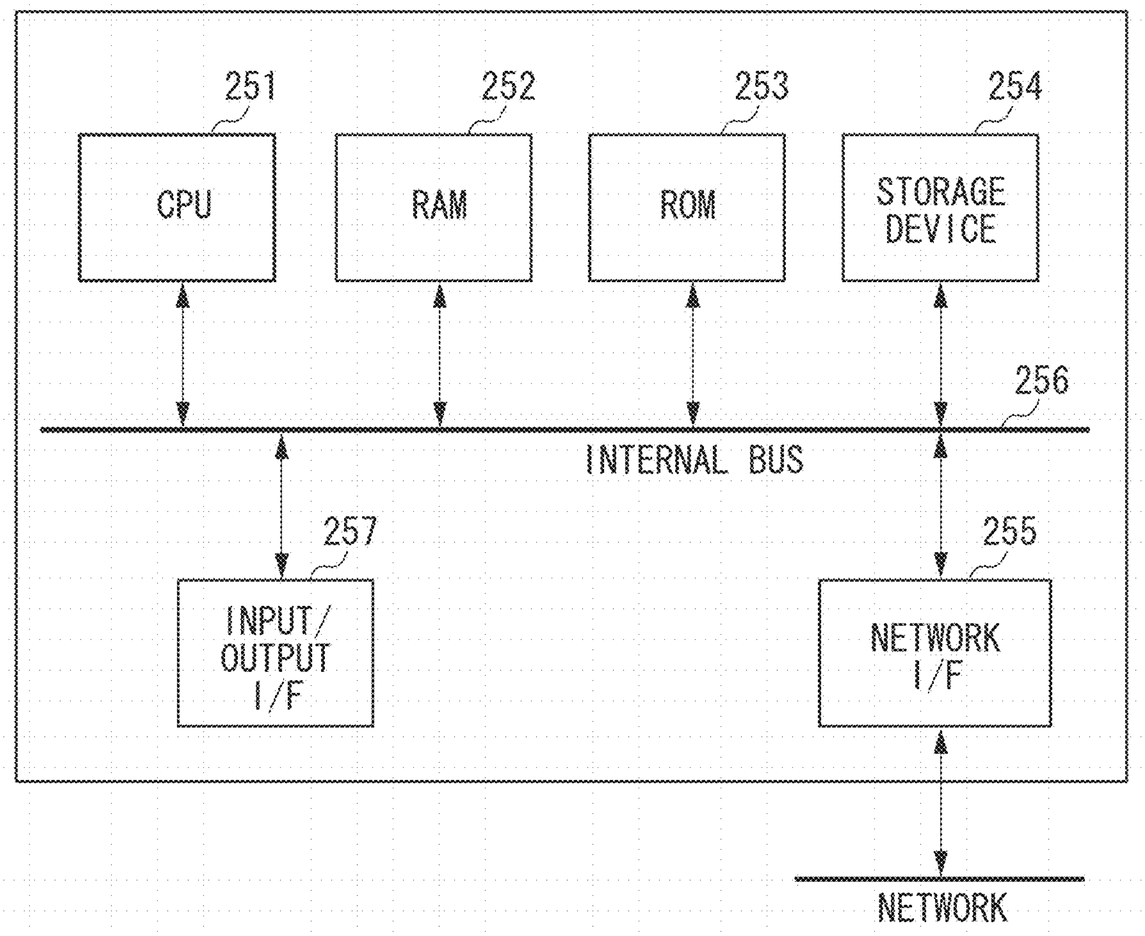
FIG. 2 is a block diagram illustrating an example of a hardware configuration of an information processing apparatus.

FIG. 2 is a block diagram illustrating an example of a hardware configuration of an information processing apparatus according to the exemplary embodiment of the present invention. The information processing apparatus according to the present exemplary embodiment is a server computer, such as the monitoring device 101, or the external server 104 existing in a data center for establishing the management system. The server computer provides an environment in which virtual machines such as the web server 1051, the application server 1052, and the storage system 106 operate.

The information processing apparatus includes a central processing unit (CPU) 251 that executes a program stored in a read only memory (ROM) 253, and collectively controls respective devices via an internal bus 256. A random access memory (RAM) 252, the ROM 253, a storage device 254, a network interface (I/F) 255, and an input/output I/F 257 are connected to the internal bus 256.

For example, the input/output I/F 257 includes a PS/2 I/F, a universal serial bus (USB) I/F, and an analog or digital display I/F. A keyboard, a mouse, a cathode-ray tube (CRT) monitor, and a liquid crystal display (not illustrated) can be connected to the information processing apparatus through the input/output I/F 257.

The information processing apparatus executes communication through the network I/F 255 via a LAN, an Intranet environment, and/or the Internet. With this configuration, the information processing apparatus can communicate with the network devices or other information processing apparatuses.

The CPU 251 executes execution processing of the program in cooperation with the RAM 252 and/or the ROM 253. Further, the CPU 251 can execute a program for realizing virtualization technology. Further, the CPU 251 executes processing for storing data in a storage medium such as the storage device 254.

The storage device 254 functions as an external storage device and can store various kinds of system information and processing information in place of the RAM 252 in addition to various kinds of information.

<Functional Configuration of External Device>

Figure 3:
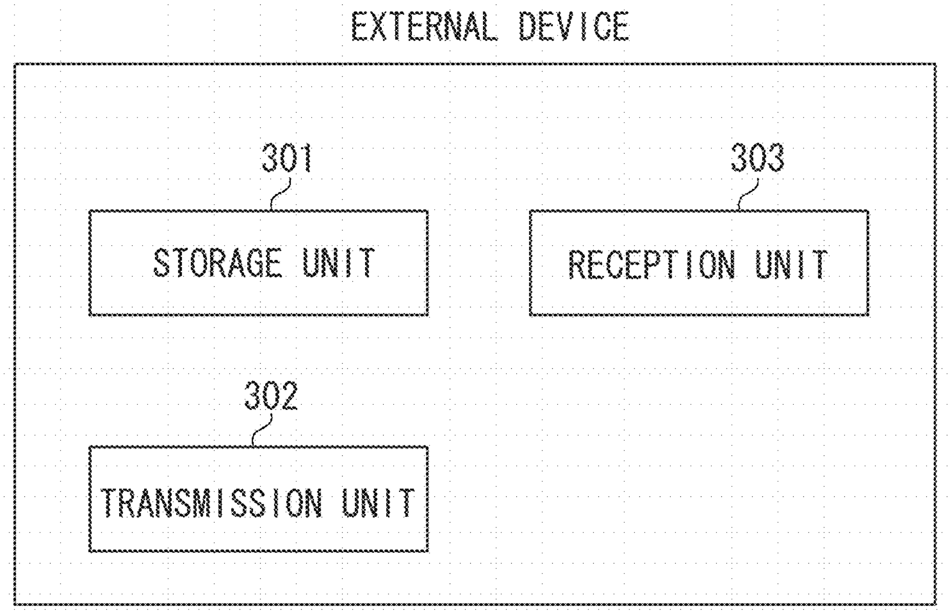
FIG. 3 is a block diagram illustrating an example of a functional configuration of an external device.

FIG. 3 is a block diagram illustrating an example of a functional configuration of the external device according to the present exemplary embodiment.

A storage unit 301 stores data such as counter information, log information, and status information. Specifically, the storage unit 301 may be a storage device (not illustrated) included in the network device 100, such as the ROM 253 or the storage device 254 included in the monitoring device 101 and/or the external server 104.

A transmission unit 302 transmits data stored in the storage unit 301 to the management system 105 or the storage system 106. For example, information with no immediacy such as counter information and log information may be transmitted on a date and time determined by a schedule, whereas status information such as error information or failure information may be transmitted as needed. Further, the transmission unit 302 notifies the web server 1051 of a storage result of data stored in the storage system 106 by the external device.

A reception unit 303 receives a response from the web server 1051 or the storage system 106. Examples of response contents include a transmission result of data transmitted to the management system 105 by the external device or a storage result of data stored in the storage system 106 by the external device. Further, the reception unit 303 receives connection information from the web server 1051. The connection information will be described below with reference to FIG. 11.

Further, the functional configuration of the external device according to the present exemplary embodiment is not limited to the above-described configuration. In addition to the above-described configuration, the external device according to the present exemplary embodiment includes a configuration for controlling the hardware specific to each external device.

<Functional Configuration of Web Server 1051>

Figure 4:
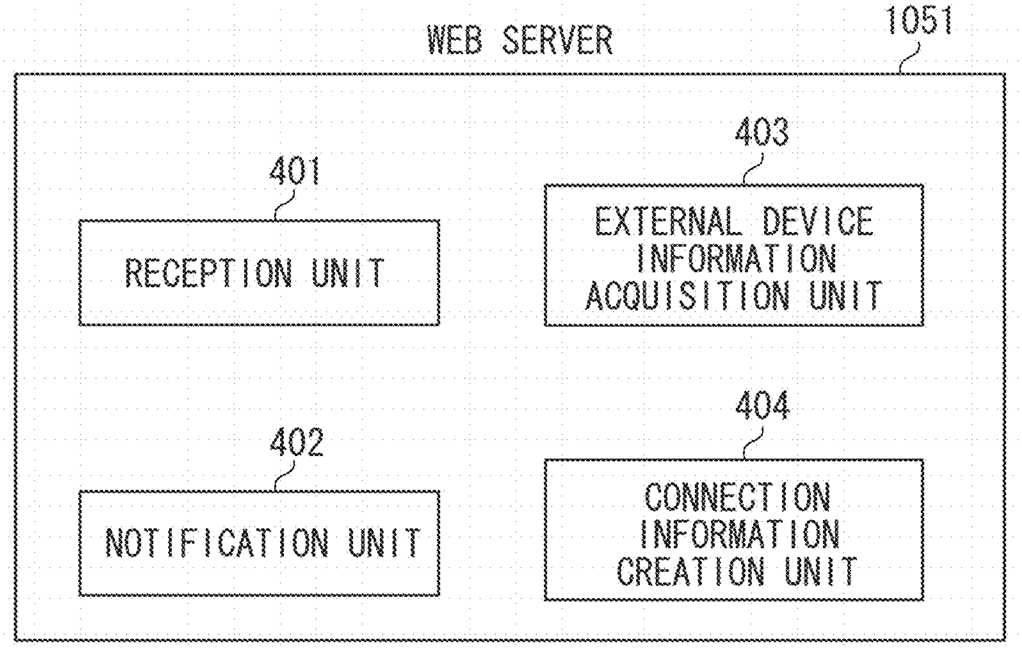
FIG. 4 is a block diagram illustrating an example of a functional configuration of a web server.

FIG. 4 is a block diagram illustrating an example of a functional configuration of the web server 1051 according to the present exemplary embodiment.

A reception unit 401 receives data transmitted from the transmission unit 302 of the external device. Further, the reception unit 401 receives a notification such as a request from the external device or a storage result of data stored in the storage system 106 by the external device.

An external device information acquisition unit 403 acquires information indicating a type of the external device serving as a transmission source of the request. The types of external devices include the network device 100, the monitoring device 101, and the external server 104. For example, the external device information acquisition unit 403 identifies an external device type based on authentication information included in the request. The information indicating the external device type is managed in a storage region allocated to the web server 1051 or the storage system 106 in association with the authentication information. Further, the information indicating the external device type may be included in the request from the external device.

A connection information creation unit 404 creates connection information to be used when the external device stores data in the storage system 106. The connection information is used when the external device directly transmits data to and stores it in the storage system 106. Details of processing including a creation method of the connection information will be described below with reference to FIG. 11.

A notification unit 402 transfers data received by the reception unit 401 to the application server 1052. At this time, the notification unit 402 may transfer the data to the application server 1052 after executing necessary processing on that data. Further, the notification unit 402 may transfer the data to the storage system 106 instead of the application server 1052. In this case, the storage system 106 stores the received data.

Further, the notification unit 402 transmits the connection information created by the connection information creation unit 404 to the external device or the application server 1052. Further, the notification unit 402 notifies the external device of a reception result of data or a notification transmitted from the external device.

<Functional Configuration of Application Server 1052>

Figure 5:
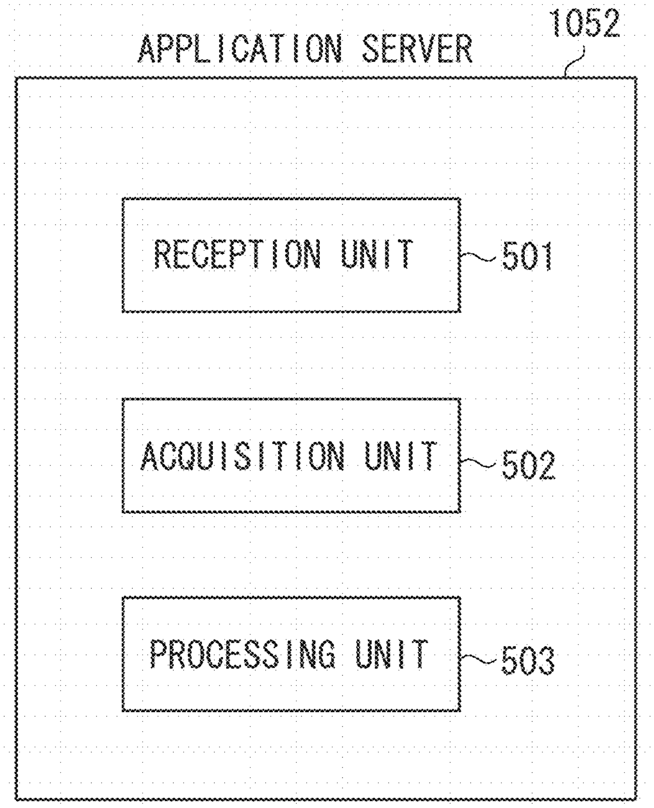
FIG. 5 is a block diagram illustrating an example of a functional configuration of an application server.

FIG. 5 is a block diagram illustrating an example of a functional configuration of the application server 1052 according to the present exemplary embodiment.

A reception unit 501 receives data transferred from the web server 1051. Further, the reception unit 501 receives connection information transmitted by the web server 1051.

An acquisition unit 502 acquires data stored in the storage system 106 by using the information indicating a storage destination of the data included in the connection information received by the reception unit 501.

A processing unit 503 executes necessary processing on the data received by the reception unit 501 or acquired by the acquisition unit 502. For example, in order to report and provide log information and/or a counter value of a print job to the client, the processing unit 503 executes processing for outputting the information as a report. Further, the processing unit 503 detects that a malfunction has occurred in the network device and executes processing for sending a notification mail to a service engineer.

<Functional Configuration of Storage System 106>

Figure 6:
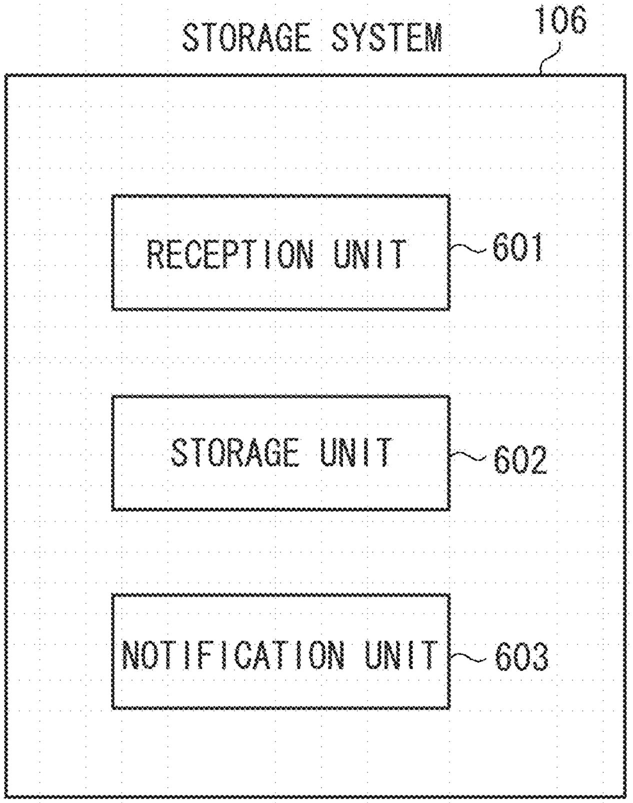
FIG. 6 is a block diagram illustrating an example of a functional configuration of a storage system 106.

FIG. 6 is a block diagram illustrating an example of a functional configuration of the storage system 106 according to the present exemplary embodiment.

A reception unit 601 receives data transmitted from the external device, the web server 1051, and the application server 1052.

A storage unit 602 stores data received by the reception unit 601 in the ROM 253 or the storage device 254 in the storage system 106.

A notification unit 603 notifies the external device, the web server 1051, or the application server 1052 of a storage result of data stored in the storage unit 602.

<Series of Operational Processing of System According to Present Exemplary Embodiment>

Figure 7:
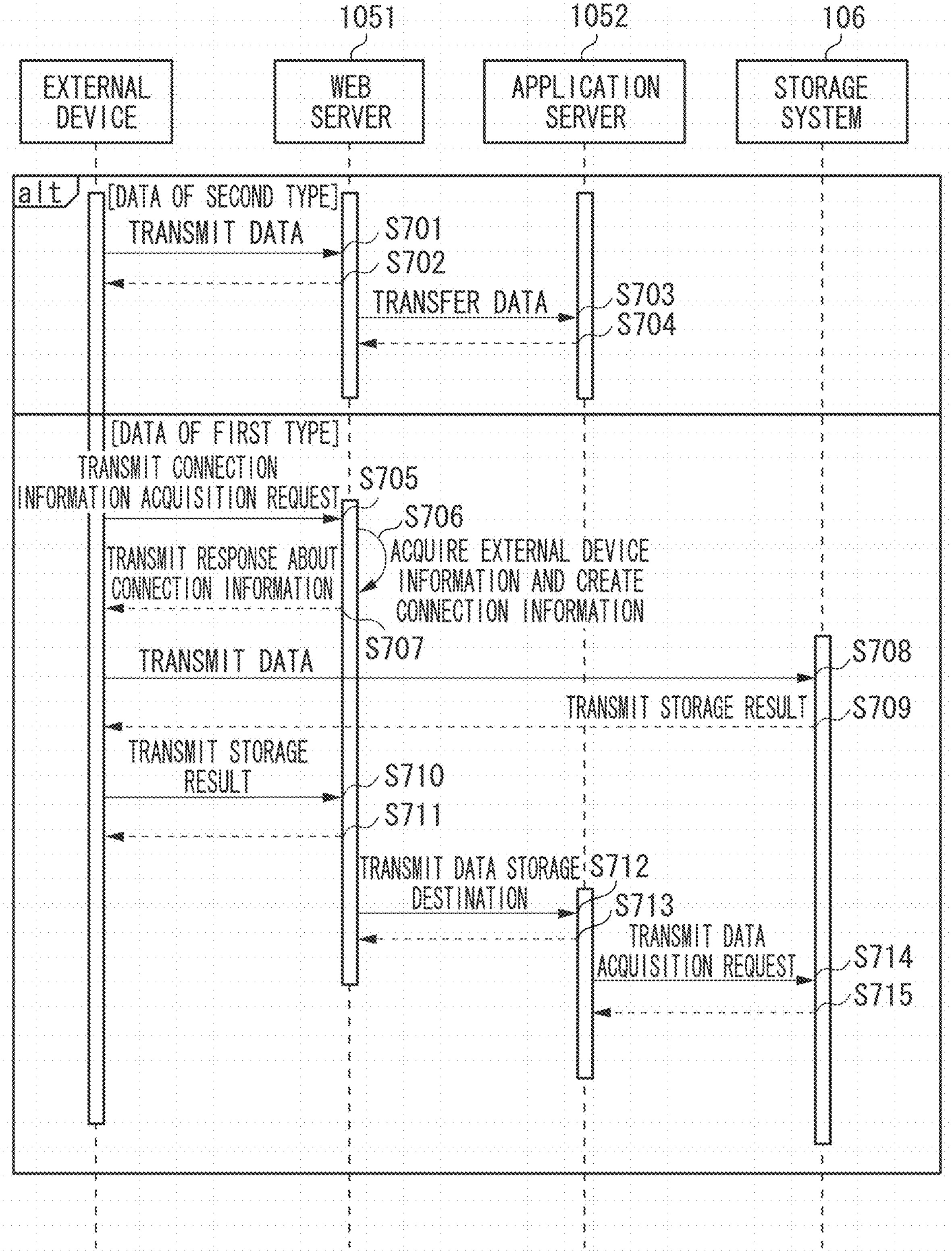
FIG. 7 is a sequence diagram illustrating an example of operational processing of a system according to an exemplary embodiment of the present invention.

FIG. 7 is a sequence chart illustrating an example of operational processing of a system according to the present exemplary embodiment.

In the present exemplary embodiment, whether data should be transmitted to the web server 1051 or the storage system 106 is previously determined according to a type of data such as counter information, log information, or the status information, so that the transmission unit 302 of the external device transmits the data accordingly. For example, the external device directly transmits data (first type data) that is relatively large in size and does not require immediacy to the storage system 106 without passing through the web server 1051. On the other hand, data (second type data) that requires a certain degree of immediacy, such as data transmitted from the external device to which a response about a processing result has to be transmitted, the external device transmits the data to the web server 1051. In a case where the external device transmits the data to the web server 1051, the external device can receive a response about the processing result earlier than in a case where the data is transmitted to the storage system 106.

As described above, because the data that is relatively large in size and does not require immediacy is transmitted to the storage system 106 instead of the web server 1051, it is possible to reduce a processing load relating to data reception executed by the web server 1051. In the present exemplary embodiment, according to the data type, the web server 1051 may previously determine the I/F used by the external device to communicate with the management system 105.

Further, data that is relatively small in size may be also included in the second type data in addition to the data that requires immediacy. For example, device information of the network device or status information indicating information indicating an single isolated error or failure may be included. Further, data other than the first type data may be determined as the second type data instead of particularly defining the second type data.

A flow of processing that is to be executed when the data transmitted by the transmission unit 302 of the external device is the second type data will be described in steps S701 to S704. Further, a flow of processing that is to be executed when the data transmitted by the transmission unit 302 of the external device is the first type data will be described in steps S705 to S715. Flows of processing will be switched depending on the data type.

First, a flow of processing executed when the external device transmits the second type data to the web server 1051, will be described.

In step S701, the transmission unit 302 of the external device transmits the second type data, and the reception unit 401 of the web server 1051 receives that data. In addition, the transmission unit 302 may transmit a transfer request for requesting transfer of data to the web server 1051 before transmitting the data thereto.

In step S702, the notification unit 402 of the web server 1051 notifies the external device of a reception result of the data received in step S701. When the data is received normally, the processing proceeds to step S703.

In step S703, the notification unit 402 of the web server 1051 transfers the data received in step S701 to the application server 1052. The notification unit 402 transfers the received data to the application server 1052 or transmits the data to and stores it in the storage system 106 after executing data conversion processing on the data as necessary.

In step S704, the reception unit 501 of the application server 1052 notifies the web server 1051 of a reception result of the data received in step S703.

Next, a flow of processing executed when the external device directly transmits the first type data to the storage system 106, will be described.

In step S705, the transmission unit 302 of the external device transmits a connection information acquisition request for accessing the storage system 106 to the web server 1051. Details of the connection information acquisition request will be described below with reference to FIG. 9.

In step S706, the external device information acquisition unit 403 of the web server 1051 acquires information indicating the external device type. At this time, the external device information acquisition unit 403 identifies the external device type based on the authentication information included in the acquisition request transmitted in step S705. Then, the connection information creation unit 404 of the web server 1051 creates the connection information for allowing the external device to access the storage system 106. The connection information creation unit 404 creates the connection information by using the information indicating the external device type. Details of processing including a creation method of the connection information will be described below with reference to FIG. 11.

In step S707, the notification unit 402 transmits response to the external device about the connection information created in step S706.

In step S708, the transmission unit 302 of the external device transmits data to and stores the data in the storage system 106 by using the connection information received in step S707.

In step S709, the notification unit 603 of the storage system 106 notifies the external device of a storage result of the data stored in step S708.

In step S710, the transmission unit 302 of the external device notifies the web server 1051 of the storage result of the data stored in step S708.

In step S711, the notification unit 402 of the web server 1051 notifies the external device of the result received in step S710.

In step S712, the notification unit 402 of the web server 1051 transmits the information indicating a data storage destination included in the connection information transmitted to the external device in step S707, to the application server 1052.

In step S713, the reception unit 501 of the application server 1052 notifies the web server 1051 of the result received in step S712.

In step S714, the application server 1052 transmits a data acquisition request to the storage system 106 by using the information indicating the data storage destination transmitted in step S712.

In step S715, the notification unit 603 of the storage system 106 notifies the application server 1052 of the result received in step S714 and transmits the corresponding data. Further, the notification unit 603 may transmit only the corresponding data without notifying the application server 1052 of the result received in step S714.

In addition, after the external device transmits the data to and stores it in the storage system 106 in step S708, the storage system 106 may notify the web server 1051 of the storage result, and the processing may proceeds to step S712. Further, after the external device transmits the data to and stores it in the storage system 106 in step S708, the storage system 106 may notify the application server 1052 of the storage destination of the data and advance the processing to step S714.

<Processing Executed by External Device According to Present Exemplary Embodiment>

Figure 8:
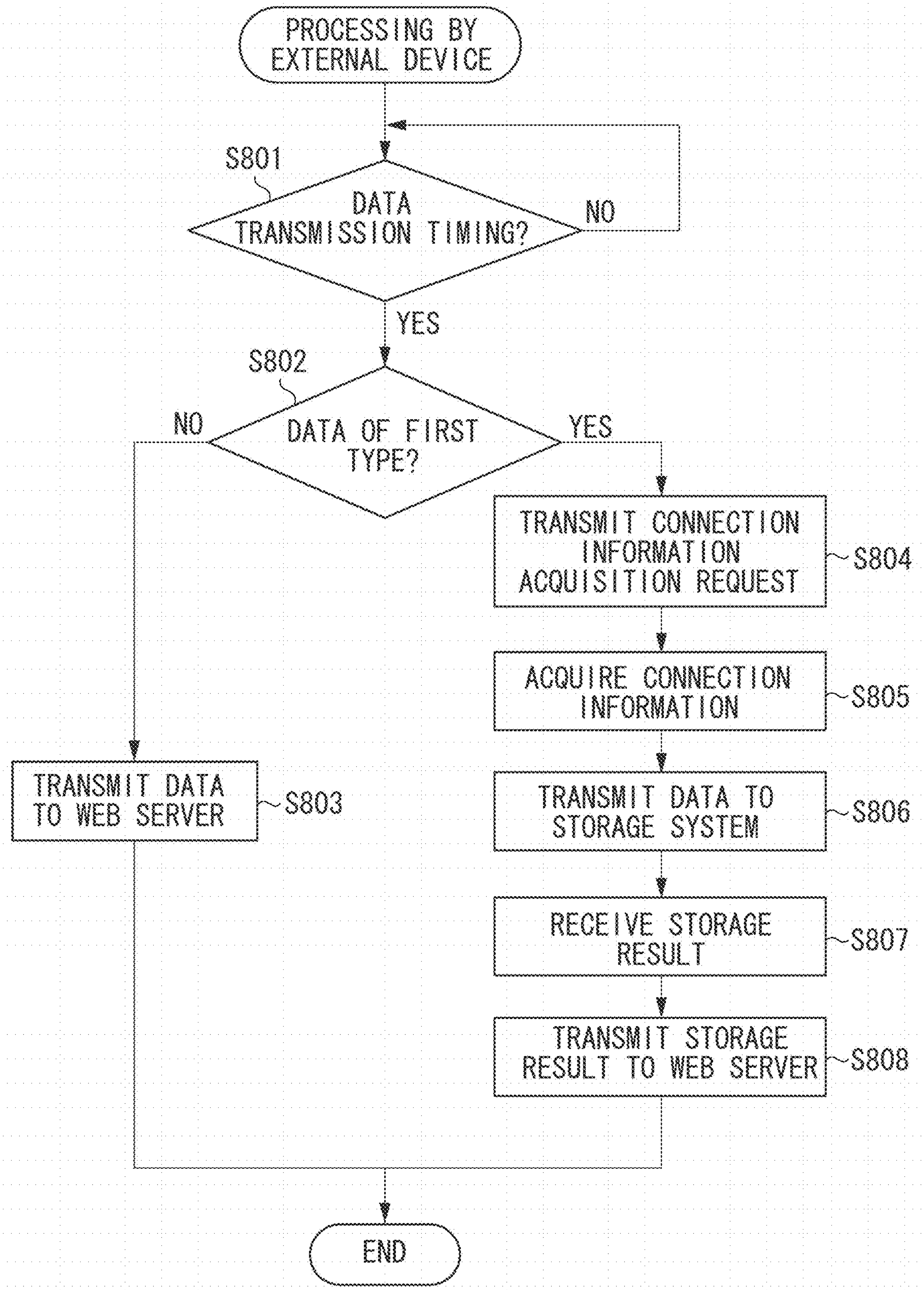
FIG. 8 is a flowchart illustrating an example of processing executed by the external device.

FIG. 8 is a flowchart illustrating an example of processing executed when the external device according to the present exemplary embodiment transmits data.

In step S801, the transmission unit 302 determines whether a data transmission timing has come. For example, the transmission unit 302 transmits the counter information and/or the log information to the web server 1051 when a date and time that is determined by a schedule internally managed by the external device has come. Further, the transmission unit 302 transmits the status information to the web server 1051 whenever an error or failure has occurred in the network device 100. If it is determined that the data transmission timing has come (YES in step S801), the processing proceeds to step S802.

In step S802, the transmission unit 302 checks whether the data to be transmitted next is the first type data that is relatively large in size and does not require immediacy. If the data is not the first type data (NO in step S802), the processing proceeds to step S803. If the data is the first type data (YES in step S802), the processing proceeds to step S804.

In addition, the external device may store a table in which types of data to be transmitted are associated with transmission destinations of data, and determine whether to advance the processing to step S803 or S804 by referring to that table.

In step S803, the transmission unit 302 transmits the data stored in the storage unit 301 to the management system 105. Thereafter, the reception unit 303 receives a transmission result in step S803 from the web server 1051.

Next, processing to be executed when the external device transmits data to the storage system 106, will be described.

In step S804, the transmission unit 302 transmits a connection information acquisition request to the web server 1051.

Figure 9:
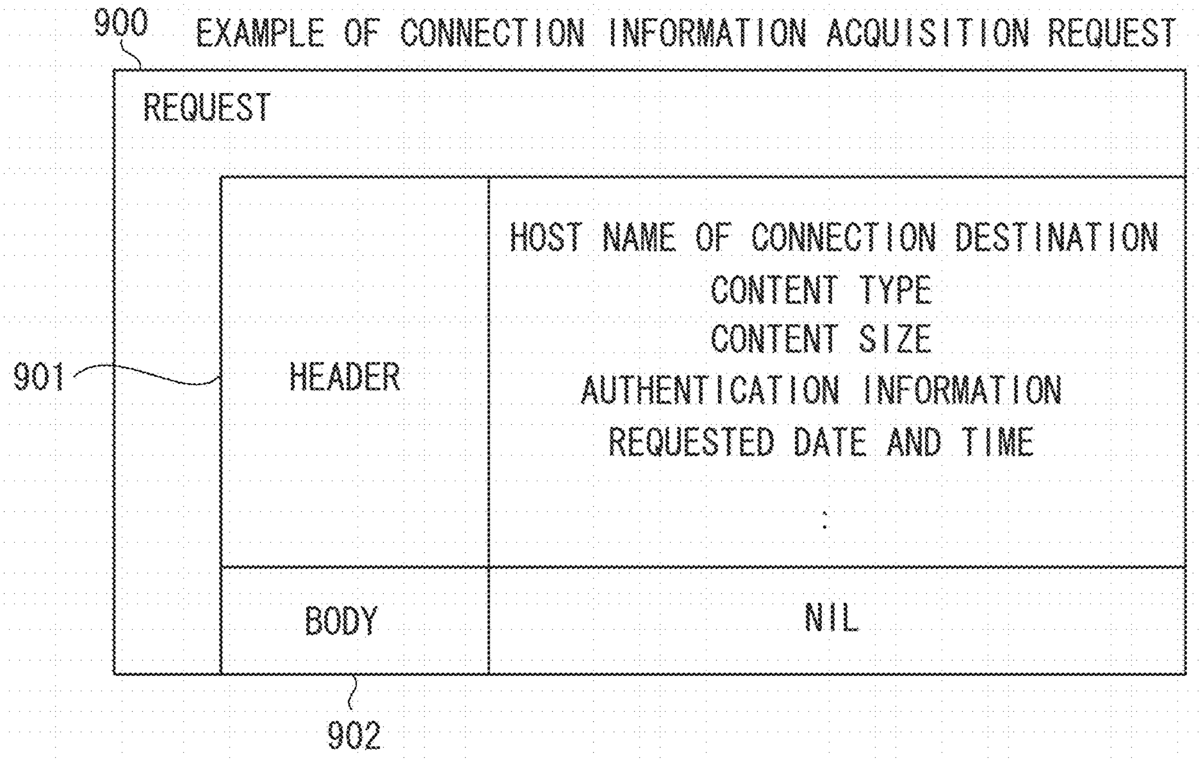
FIG. 9 is a diagram illustrating an example of request information indicating a connection information acquisition request.

Next, a data structure of the connection information acquisition request transmitted by the external device will be described with reference to FIG. 9. FIG. 9 is a diagram illustrating an example of request information indicating the connection information acquisition request.

A request 900 includes a header 901 and a body 902. The header 901 includes a host name of a connection destination, a content type, a content size, authentication information, and requested date and time. The authentication information included in the header 901 is necessary for the external device to access a system within the management system 105 such as the web server 1051. The authentication information is the information unique to each external device and previously stored in the external device.

Returning to FIG. 8, in step S805, the reception unit 303 receives the connection information transmitted from the web server 1051.

In step S806, the transmission unit 302 transmits data stored in the storage unit 301 to the storage system 106 by using the connection information received by the reception unit 303. Thereafter, in step S807, the reception unit 303 receives a notification about a storage result of the data transmitted in step S806 from the storage system 106.

In step S808, the transmission unit 302 notifies the web server 1051 of the data storage result received in step S807.

<Processing Executed by Web Server According to Present Exemplary Embodiment>

Figure 10:
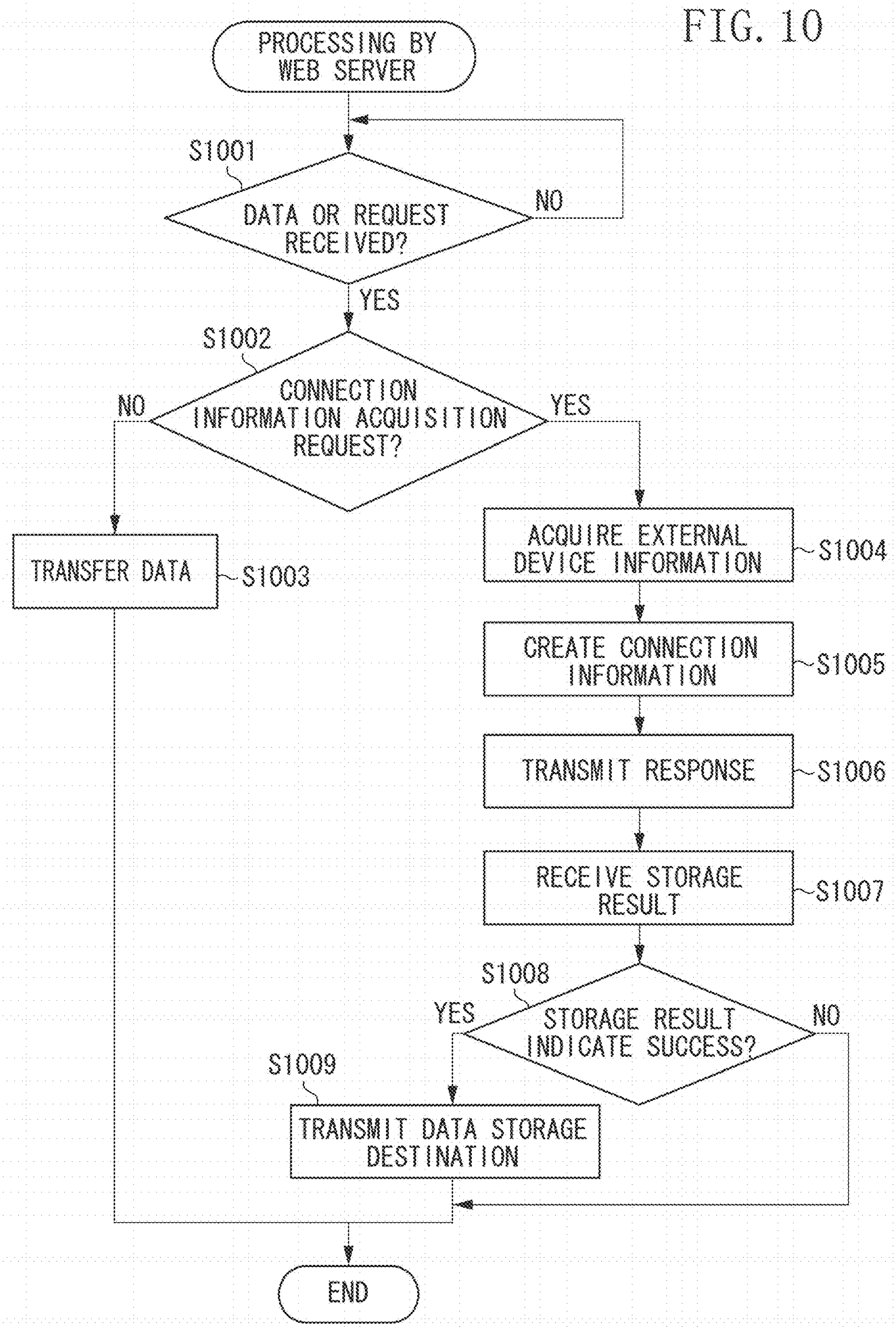
FIG. 10 is a flowchart illustrating an example of processing executed by the web server.

FIG. 10 is a flowchart illustrating an example of processing executed by the web server 1051 according to the present exemplary embodiment.

In step S1001, the reception unit 401 determines whether data or a request is received from the external device. If the reception unit 401 receives data or a request from the external device (YES in step S1001), the processing proceeds to step S1002. Thereafter, the notification unit 402 notifies the external device of a reception result in step S1001.

In step S1002, the reception unit 401 checks the received content. If the reception unit 401 receives a request other than the connection information acquisition request (NO in step S1002), the processing proceeds to step S1003. If the reception unit 401 receives the connection information acquisition request (YES in step S1002), the processing proceeds to step S1004. In addition, when the reception unit 401 receives a data transfer request, the processing may proceed to step S1003. Further, when the reception unit 401 receives data, the received data may be regarded as the data transfer request, and the processing proceeds to step S1003.

In step S1003, the notification unit 402 transfers the data received by the reception unit 401 to the application server 1052 or the storage system 106. The notification unit 402 transfers the data after executing data conversion processing on the received data according to the data type as necessary.

Next, processing to be executed by the web server 1051 when the external device transmits data to the storage system 106, will be described.

In step S1004, the external device information acquisition unit 403 acquires information indicating the external device type based on the authentication information included in the header 901 of the connection information acquisition request received by the reception unit 401. As described above, the web server 1051 manages the association between the information indicating the external device type and the authentication information. The external device information acquisition unit 403 can acquire the information indicating the external device type associated with the authentication information included in the request. In addition, when the information indicating the external device type is included in the connection information acquisition request, the external device information acquisition unit 403 may acquire the information indicating the external device type from the content of the connection information acquisition request.

In step S1005, the connection information creation unit 404 determines a storage destination of the data by using the information indicating the external device type acquired by the external device information acquisition unit 403 in step S1004. The connection information creation unit 404 specifies the determined storage destination and a file name of the data to cause the storage system 106 to issue the connection information. With this processing, the connection information creation unit 404 creates the connection information.

Figure 11:
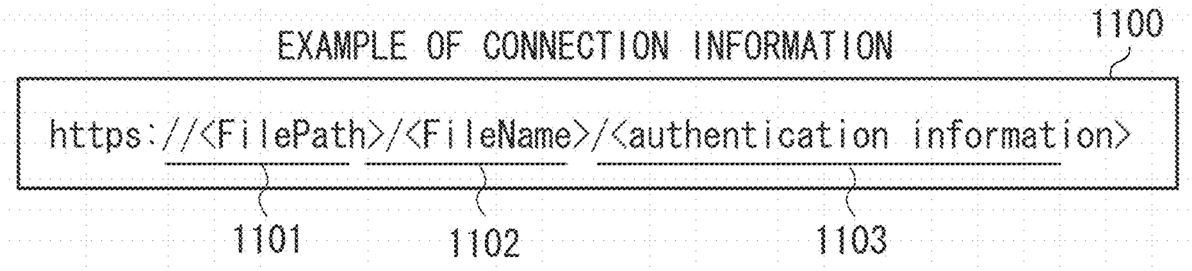
FIG. 11 is a diagram illustrating an example of connection information.

Next, the connection information will be described with reference to FIG. 11. FIG. 11 is a diagram illustrating an example of the connection information. The connection information is used when the external device directly transmits data to and stores it in the storage system 106. Connection information 1100 used by the external device to access the storage system 106 includes a file path 1101, a file name 1102, and authentication information 1103. The file path 1101 is the information indicating a storage destination of data. The file name 1102 is the information indicating a file name of data stored in the storage system 106 by the external device. The authentication information 1103 is authentication information that allows the external device to access the storage system 106. Because the authentication information 1103 is included in the connection information 1100, the storage system 106 can be accessed from only a specific client, and thus security thereof will be ensured.

As described above, information indicating the external device type is included in the file path 1101 that describes the storage destination of data. Because a format or granularity of the transmitted data is different depending on the type of the external device, it is necessary to execute data processing appropriate therefor. Therefore, if a storage destination of data is sorted according to the type of the external device serving as a transmission source when the data is stored in the storage system 106, the application server 1052 can easily determine a processing method suitable for the format and/or the granularity of the data. As a result, a load relating to data processing can be reduced.

Further, by sorting the storage destination of data according to the external device type, the external device serving as a transmission source of data stored in the storage system 106 can be identified easily. This is useful in debugging.

Further, the connection information creation unit 404 can also set a valid period of the authentication information. More specifically, the valid period of the authentication information is set by specifying until what time the authentication information is valid. By setting the valid period of the authentication information, even in a case where the connection information is stolen and a large amount of data is transmitted to the storage system 106, it is possible to minimize the influence caused thereby. Further, a length of the valid period of the authentication information may be changed depending on the data type. For example, with respect to history information such as log data, because the data size is larger and the communication time is longer than those of snapshot data such as a counter value, a valid period longer than that of the snapshot data is set thereto. Further, a valid period shorter than that of the history information such as log data is set to the snapshot data such as a counter value.

Further, as another method for setting the valid period, the connection information creation unit 404 may manage communication time at which the web server 1051 communicates with the external device to determine the valid period based on a difference between the latest communication time and the current time when the connection information is created. For example, if the web server 1051 has not communicated with the external device for a long period, data that has been accumulated during that period is transmitted at one time, and thus it is necessary to set the valid period longer than usual.

Returning to FIG. 10, in step S1006, with respect to the connection information acquisition request received by the reception unit 401, the notification unit 402 transmits response to the external device about the connection information created by the connection information creation unit 404.

The external device receives the response and transmits data to the storage system 106 by using the connection information. The external device notifies the web server 1051 of the received storage result of data.

In step S1007, the reception unit 401 receives a notification about a storage result of the data stored in the storage system 106 from the external device.

In step S1008, the reception unit 401 determines whether the data storage result received in step S1007 indicates success. If the storage result indicates a success (YES in step S1008), the processing proceeds to step S1009. If the storage result indicates a failure (NO in step S1008), the processing is ended.

In step S1009, the notification unit 402 notifies the application server 1052 of a storage destination of the data stored in the storage system 106 by the external device.

As described above, because the storage destination of data is sorted by the storage system 106 according to the type of the external device serving as a transmission source of the data, the application server 1052 can easily determine a processing method suitable for the format and/or the granularity of the data. As a result, a load relating to data processing is reduced when the processing is executed by the application server 1052. Further, by sorting the storage destination of data according to the type of the external device serving as a transmission source of the data, the external device serving as the transmission source of the data stored in the storage system 106 can be identified easily. This is useful in debugging of software programs of the web server 1051, the application server 1052, and the external device.

In the first exemplary embodiment, whether the data should be transmitted to the web server 1051 or the storage system 106 is previously determined according to the type of data such as the counter information, the log information, or the status information, so that the transmission unit 302 of the external device transmits the data accordingly. On the other hand, in the present exemplary embodiment, before the external device transmits data, the external device transmits a connection information acquisition request in order to inquire of the web server 1051 about whether the data should be transmitted to the web server 1051 or the storage system 106. With this configuration, it is possible to flexibly change whether the data should be transmitted to the web server 1051 or the storage system 106.

Hereinbelow, a second exemplary embodiment will be described with reference to the appended drawings. Hereinbelow, a configuration different from the first exemplary embodiment will be mainly described while the same reference numerals are assigned to the configuration and processing steps similar to those described in the first exemplary embodiment.

<Functional Configuration of Web Server According to Present Exemplary Embodiment>

Figure 12:
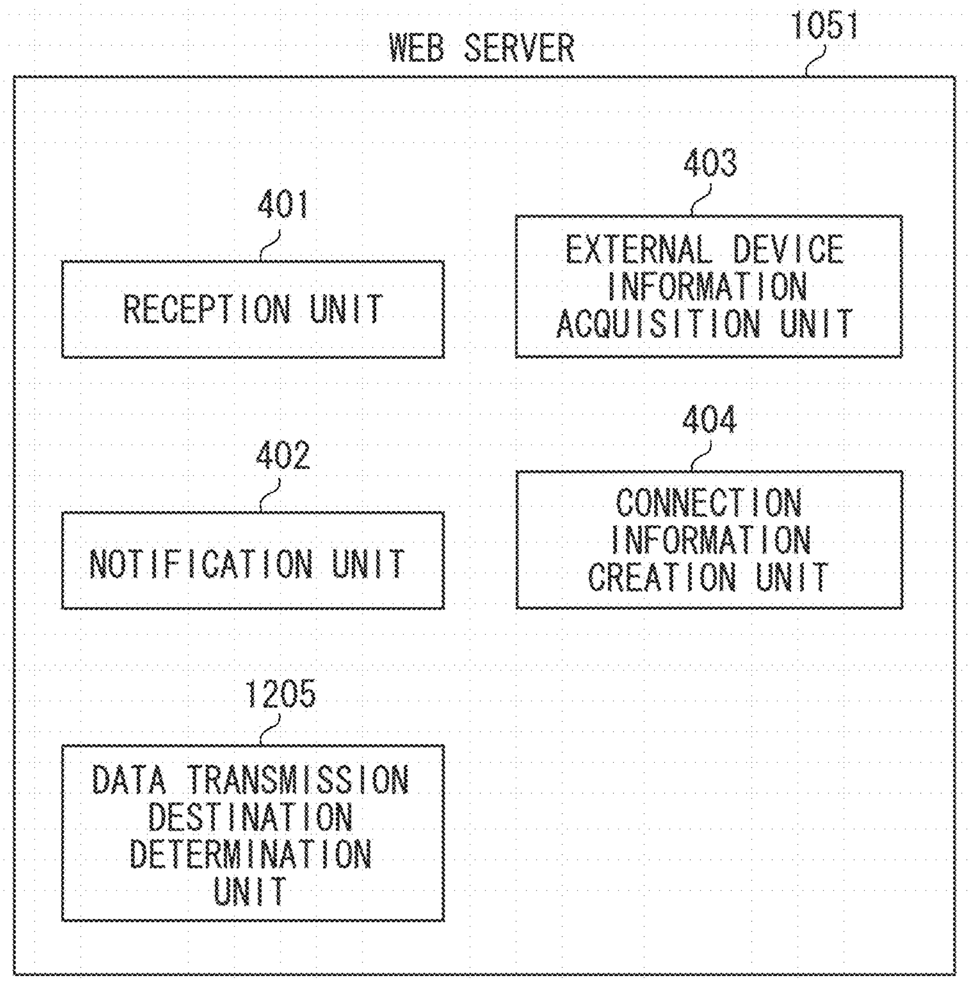
FIG. 12 is a block diagram illustrating an example of a functional configuration of a web server according to a second exemplary embodiment.

FIG. 12 is a block diagram illustrating an example of a functional configuration of the web server 1051 according to the present exemplary embodiment.

The web server 1051 according to the present exemplary embodiment further includes a data transmission destination determination unit 1205 in addition to the configuration of the web server 1051 described in the first exemplary embodiment.

When the web server 1051 receives an inquiry from the external device, the data transmission destination determination unit 1205 determines whether the external device should transmit data to the web server 1051 or the storage system 106 and creates data transmission destination information. The data transmission destination determination unit 1205 may determine the transmission destination according to the type or the size of data transmitted from the external device. Further, as another determination method, the data transmission destination determination unit 1205 may determine the transmission destination by checking a load status of the web server 1051 such as a usage rate of the CPU.

<Series of Operational Processing of System According to Present Exemplary Embodiment>

Figure 13:
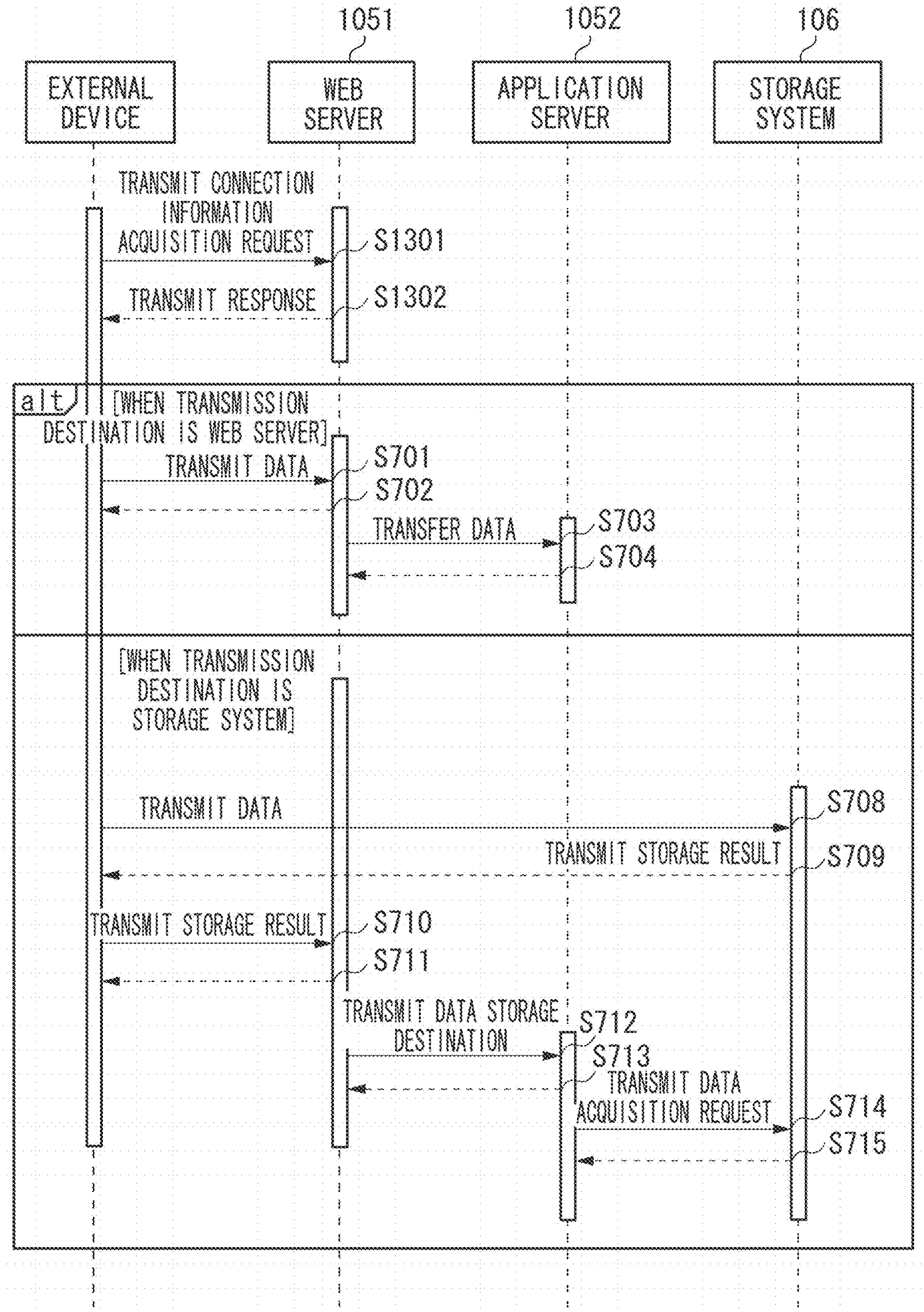
FIG. 13 is a sequence diagram illustrating an example of operational processing of a system according to the second exemplary embodiment.

FIG. 13 is a sequence diagram illustrating an example of operational processing of a system according to the present exemplary embodiment. In the present exemplary embodiment, before the external device transmits data, the external device inquires of the web server 1051 about whether the data should be transmitted to the web server 1051 or the storage system 106. The processing in steps S701 to S704 and steps S708 to S715 is as described with reference to FIG. 7.

In step S1301, the transmission unit 302 of the external device transmits the connection information acquisition request to the web server 1051. This connection information acquisition request includes information such as the type or the content of data to be transmitted by the transmission unit 302 of the external device.

In step S1302, the data transmission destination determination unit 1205 of the web server 1051 determines whether the external device should transmit the data to the web server 1051 or the storage system 106. Thereafter, the notification unit 402 of the web server 1051 transmits response to the external device about transmission destination information that indicates the determined transmission destination.

If the web server 1051 is determined to be the data transmission destination, the notification unit 402 responds thereto about the transmission destination information that includes information indicating the web server 1051 as the transmission destination. Further, if the storage system 106 is determined to be the data transmission destination, the connection information creation unit 404 creates the connection information by using the information indicating the external device type acquired by the external device information acquisition unit 403, and the notification unit 402 responds thereto about the transmission destination information and the connection information. In this case, the notification unit 402 may transmit only the connection information created by the connection information creation unit 404 without transmitting the data transmission destination information.

<Processing Executed by External Device According to Present Exemplary Embodiment>

Figure 14:
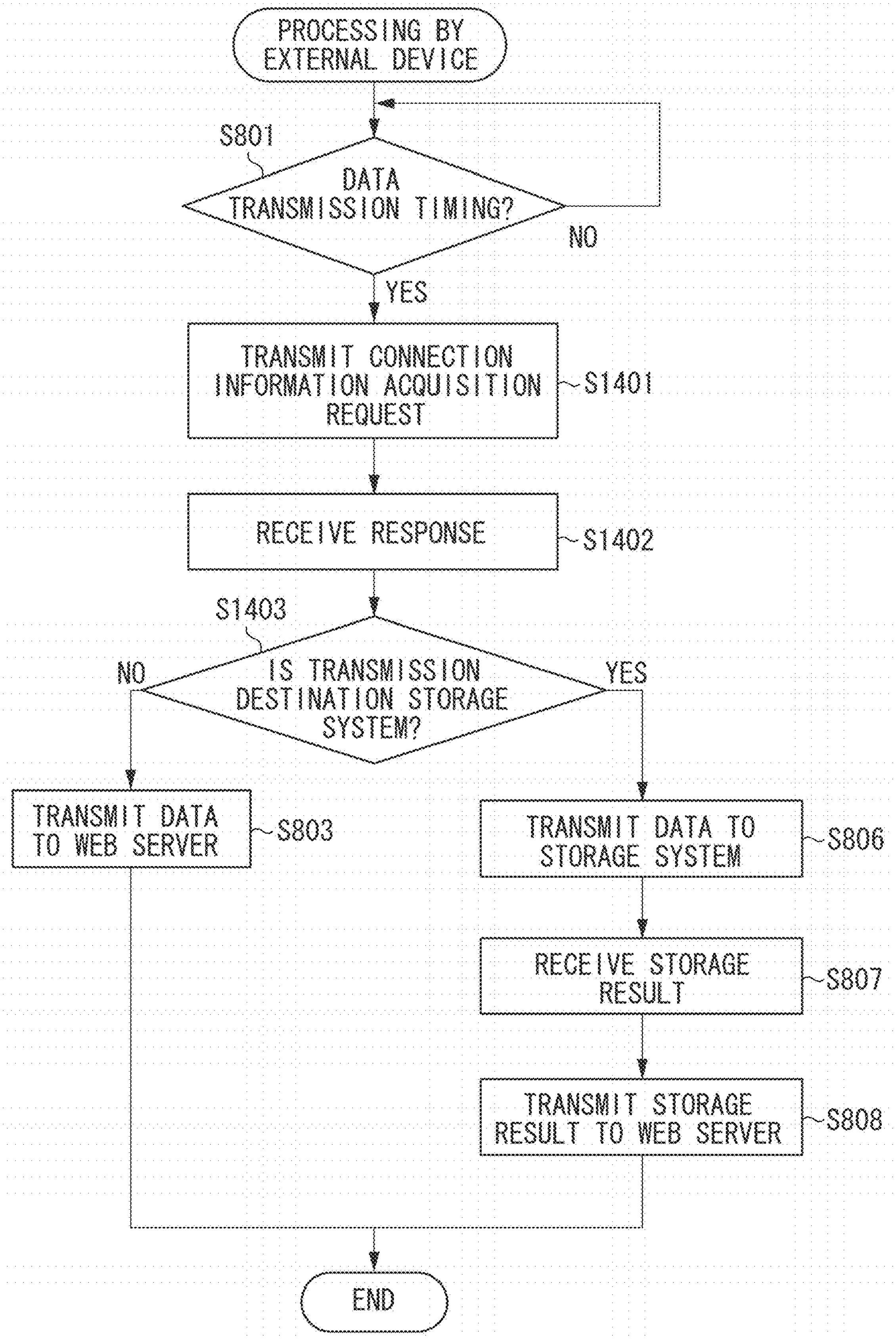
FIG. 14 is a flowchart illustrating an example of processing executed by an external device according to the second exemplary embodiment.

FIG. 14 is a flowchart illustrating an example of processing executed by the external device according to the present exemplary embodiment. The processing in steps S801, S803, and steps S806 to S808 is as described with reference to FIG. 8.

In step S1401, the transmission unit 302 transmits the connection information acquisition request to the web server 1051. The connection information acquisition request includes information such as the type and the content of data to be transmitted by the transmission unit 302 of the external device.

In step S1402, the reception unit 303 receives a response from the notification unit 402 of the web server 1051. The information indicating a data transmission destination is included in the response.

In step S1403, the transmission unit 302 determines whether the data transmission destination is the storage system 106. If the data transmission destination is the web server 1051 (NO in step S1403), the processing proceeds to step S803. If the data transmission destination is the storage system 106 (YES in step S1403), the processing proceeds to step S806. In this case, the connection information is included in the response received by the reception unit 303 in step S1402. For example, the notification unit 402 of the web server 1051 transmits a value "1" to the external device when the data transmission destination is the web server 1051 while transmitting a value "2" when the data transmission destination is the storage system 106. Obviously, the data transmission destination information can be notified by a method other than the above-described method.

<Processing Executed by Web Server According to Present Exemplary Embodiment>

Figure 15:
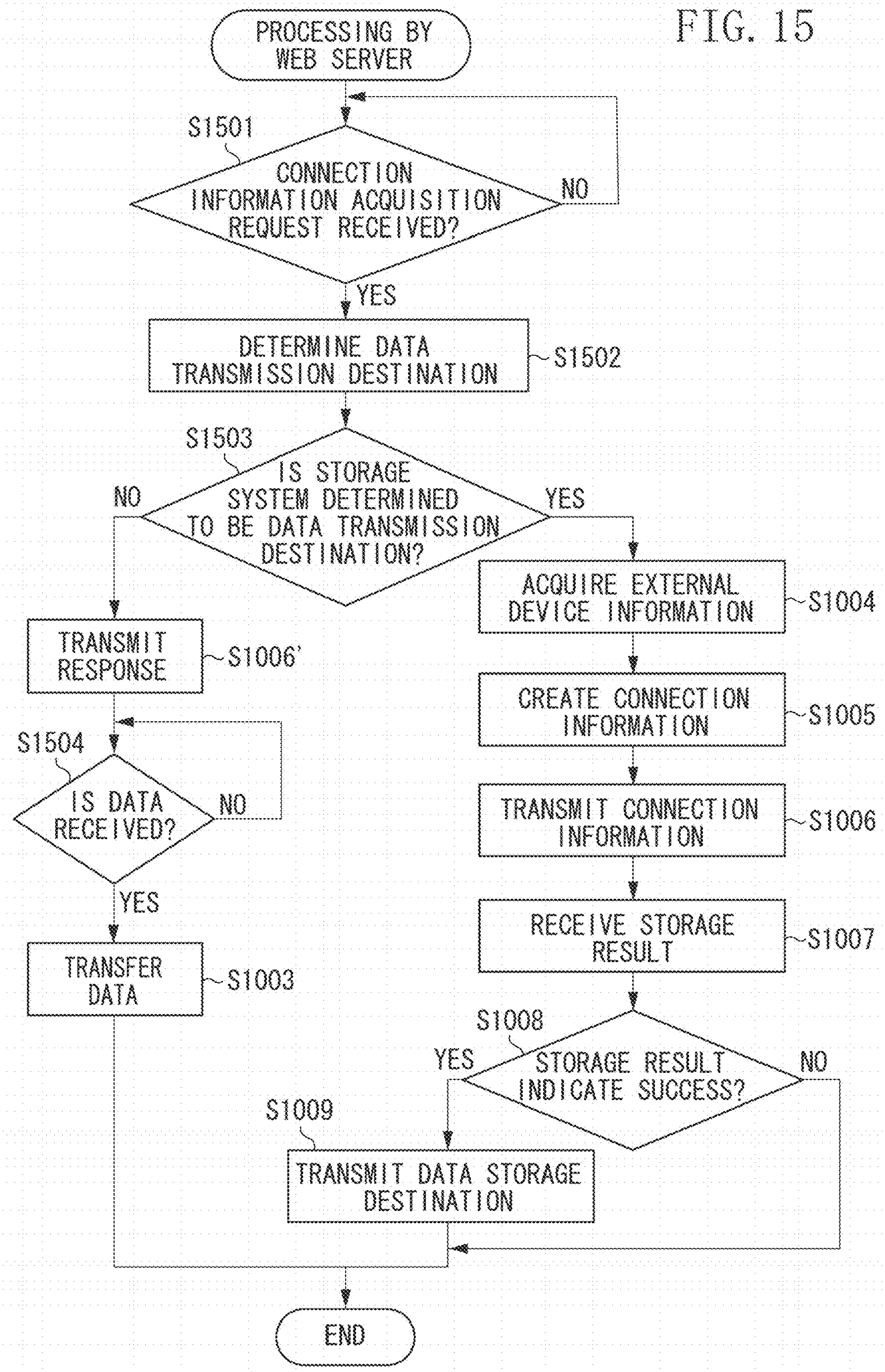
FIG. 15 is a flowchart illustrating an example of processing executed by the web server according to the second exemplary embodiment.

FIG. 15 is a flowchart illustrating an example of processing executed by the web server 1051 according to the present exemplary embodiment. The processing in steps S1003 to S1009 is as described with reference to FIG. 10.

In step S1501, the reception unit 401 determines whether the connection information acquisition request is received from the external device. If the reception unit 401 receives the connection information acquisition request from the external device (YES in step S1501), the processing proceeds to step S1502. Thereafter, the notification unit 402 notifies the external device of the reception result of step S1501.

In step S1502, the data transmission destination determination unit 1205 determines the data transmission destination and creates transmission destination information based on the information indicating the data type included in the request received from the external device in step S1501. Further, the data transmission destination determination unit 1205 may determine the transmission destination by checking a load status of the web server 1051 such as a usage rate of the CPU instead of determining based on the data type. For example, when a load of the web server 1051 such as the usage rate of the CPU is low, the data transmission destination determination unit 1205 determines that the data should be transmitted to the web server 1051. On the other hand, when a load of the web server 1051 such as the usage rate of the CPU is high, the data transmission destination determination unit 1205 determines that the data should be transmitted to the storage system 106.

In step S1503, if the web server 1051 is determined to be the data transmission destination (NO in step S1503), the processing proceeds to step S1006'. In step S1006', the notification unit 402 transmits a response about information indicating the web server 1051 as the data transmission destination to the external device. Further, if the storage system 106 is determined to be the data transmission destination (YES in step S1503), the processing proceeds to step S1004. In step S1004, information indicating the external device type is acquired, and in step S1005, the connection information is created. Thereafter, in step S1006, the notification unit 402 of the web server 1051 transmits a response including the connection information to the external device.

In step S1504, the reception unit 401 waits for reception of data from the external device. When the reception unit 401 receives the data transmitted from the transmission unit 302 of the external device (YES in step S1504), the processing proceeds to step S1003.

As described above, before the external device transmits data, the external device inquires of the web server 1051 about whether the data should be transmitted to the management system 105 or the storage system 106. With this configuration, it is possible to flexibly change whether the data should be transmitted to the management system 105 or the storage system 106.

In the first and the second exemplary embodiments, the processing is ended if a storage result of data stored in the storage system 106 by the external device indicates a failure. Then, when the next data transmission timing has come, the data that the external device has failed to store last time is transmitted again. However, depending on the cause of failure, data storage may fail again even if the data is retransmitted. For example, the external device may fail to store data in the storage system 106 because a size of the data to be transmitted is large, and thus data transmission cannot be completed within the valid period set to the authentication information included in the connection information. In the present exemplary embodiment, a method will be described in which the processing is executed flexibly instead of being ended when the external device has failed to store the data in the storage system 106.

Hereinbelow, a third exemplary embodiment will be described with reference to the appended drawings. Hereinbelow, a configuration different from the first or the second exemplary embodiment will be mainly described while the same reference numerals are assigned to the configuration and processing steps similar to those described in the first or the second exemplary embodiment.

<Processing Executed by Web Server According to Present Exemplary Embodiment>

Figure 16:
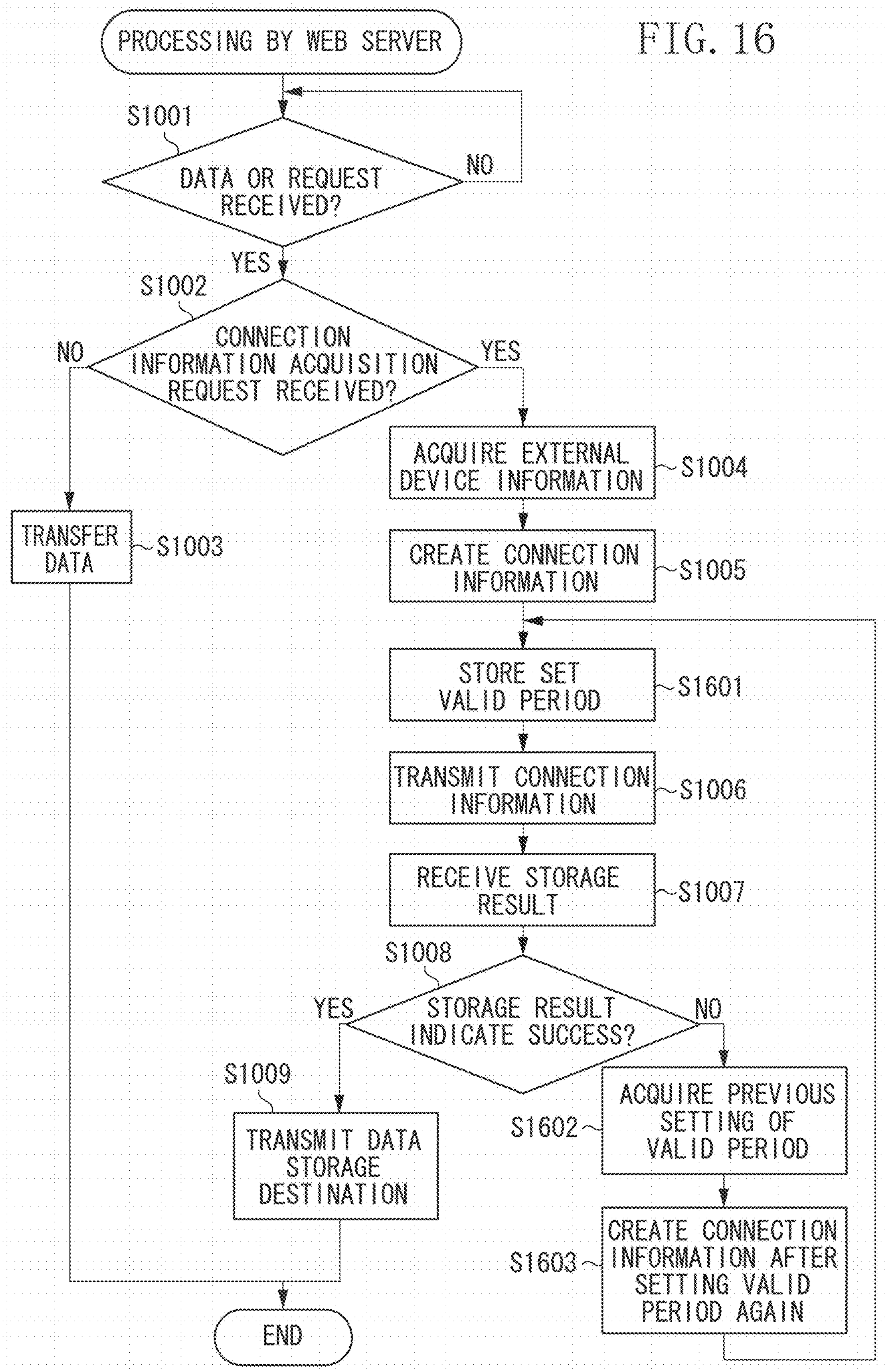
FIG. 16 is a flowchart illustrating an example of processing executed by a web server according to a third exemplary embodiment.

FIG. 16 is a flowchart illustrating an example of processing executed by the web server 1051 according to the present exemplary embodiment. In this processing, when the external device has failed to store data in the storage system 106, the external device transmits the data by using the connection information recreated by setting a longer valid period thereto. The processing in steps S1001 to S1009 is as described with reference to FIG. 10.

In step S1601, the connection information creation unit 404 stores the information indicating the valid period set when the connection information is created. The information indicating the valid period is stored in a storage region allocated to the web server 1051 or in the storage system 106.

FIG. 17 is a table illustrating an example of setting information of valid periods to be stored. A default valid period is stored for each data type. The valid period used for creating the connection information is set to a column "PREVIOUS SETTING OF VALID PERIOD". Usually, when the connection information acquisition request is transmitted from the external device, the connection information creation unit 404 sets a value of the default valid period to create the connection information.

If the storage result received in step S1007 indicates a failure (NO in step S1008), in step S1602, the connection information creation unit 404 of the web server 1051 acquires a previous setting of the valid period stored in step S1601.

In step S1603, the connection information creation unit 404 sets an valid period longer than the previous setting of the valid period to create the connection information. Thereafter, in step S1601, the connection information creation unit 404 stores the valid period set in step S1603 again. Subsequently, in step S1006, in response to the notification of the storage result received in step S1007 indicating the failure, the notification unit 402 transmits the connection information created in step S1603.

As described above, when the external device has failed to store data in the storage system 106, the connection information is newly created while setting a longer valid period thereto, so as to be transmitted to the external device. With this processing, when the external device has failed to store data in the storage system 106, the processing can be executed flexibly instead of being ended.

In the third exemplary embodiment, when the external device has failed to store data in the storage system 106, the connection information creation unit 404 of the web server 1051 creates the connection information while setting the valid period longer than the previous setting thereof. In a fourth exemplary embodiment, when the external device has failed to store data in the storage system 106, the data is transmitted to the web server 1051 instead of the storage system 106. For example, the external device may fail to store data in the storage system 106 if the storage system 106 is down for some reason.

Hereinbelow, the present exemplary embodiment will be described with reference to the appended drawings. Hereinbelow, a configuration different from the first or the second exemplary embodiment will be mainly described while the same reference numerals are assigned to the configuration and processing steps similar to those described in the first or the second exemplary embodiment.

<Processing Executed by Web Server According to Present Exemplary Embodiment>

Figure 18:
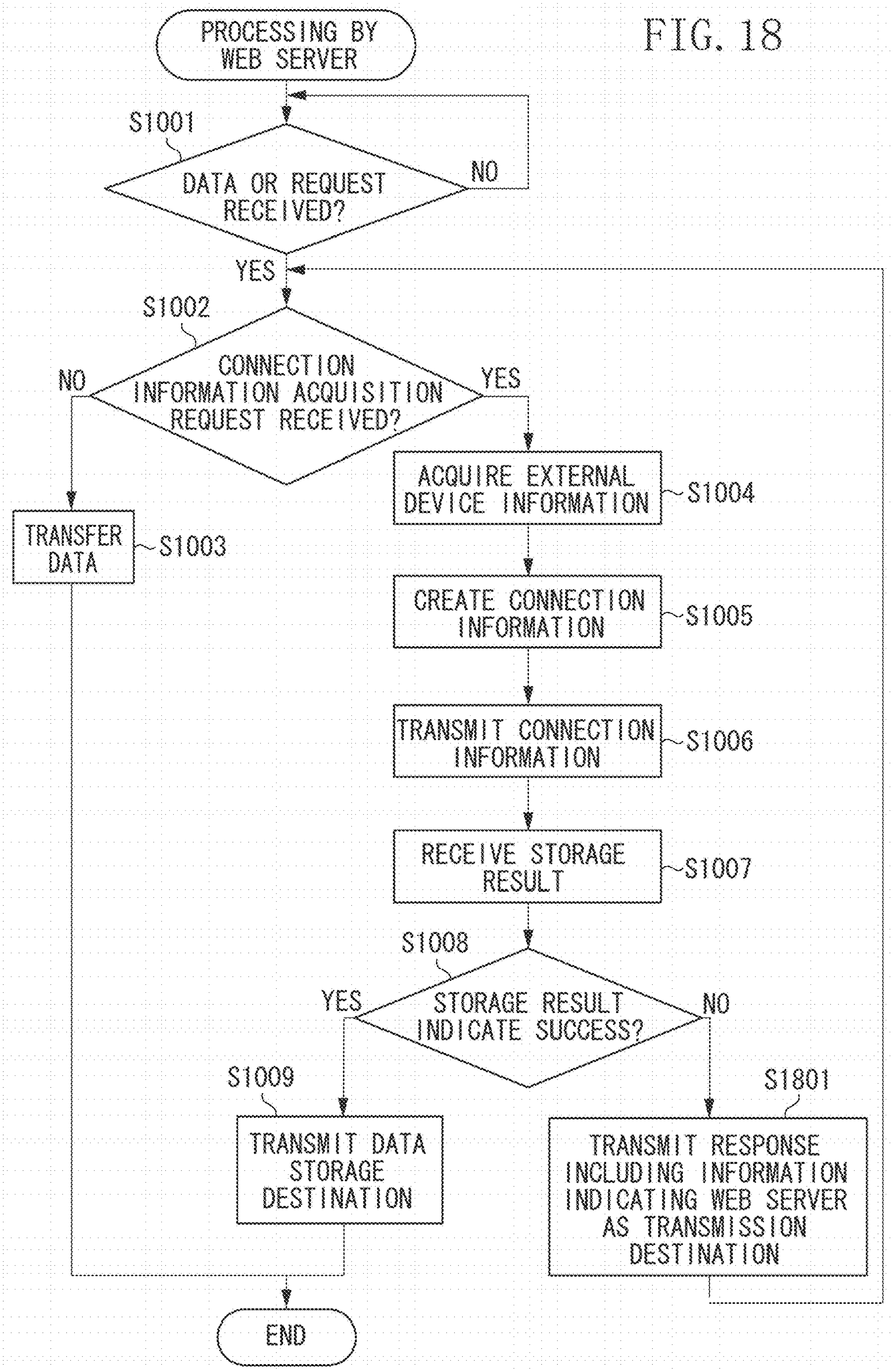
FIG. 18 is a flowchart illustrating an example of processing executed by a web server according to a fourth exemplary embodiment.

FIG. 18 is a flowchart illustrating an example of processing executed by the web server 1051 according to the present exemplary embodiment. In this processing, when the external device has failed to store data in the storage system 106, the external device transmits the data to the web server 1051.

The processing in steps S1001 to S1009 is as described with reference to FIG. 10.

If the storage result received in step S1007 indicates failure (NO in step S1008), in step S1801, the notification unit 402 transmits a response including the information indicating the web server 1051 as a data transmission destination in response to the notification about the storage result transmitted from the external device. In addition, for example, the response transmitted in step S1801 is created by the connection information creation unit 404.

As described above, when the external device has failed to store data in the storage system 106, the web server 1051 transmits a response indicating the web server 1051 as a data transmission destination to the external device. Thereafter, according to the response, the external device retransmits the data to the web server 1051. With this configuration, when the external device has failed to store data in the storage system 106, the processing can be executed flexibly instead of being ended.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-124262, filed Jun. 19, 2015, which is hereby incorporated by reference herein in its entirety.

What is claimed is:

1. A management system comprising a web server configured to communicate with a plurality of external devices storing management data of one or more network devices, and an application server configured to process management data stored in a storage system capable of storing data and management data transferred from the web server, the web server comprising:

a first memory storing instructions, and a first processor executing the instructions stored in the first memory causing the web server to:

transfer the management data to the application server in response to reception of the management data from each of the external devices;

receive an acquisition request of connection information used for transmission of the management data from each of the external devices;

create connection information including information indicating a storage destination in the storage system and authentication information for allowing the external device to access the storage system, wherein, for the authentication information, a valid period is set;

transmit a response including the created connection information, in response to the acquisition request;

receive, from the external device, a result notification about a storage result of management data by using the connection information;

transmit, according to the reception of the result notification, the storage destination included in the connection information to the application server, and the application server comprising:

a second memory storing instructions, and a second processor executing the instructions stored in the second memory causing the application server to:

process the transferred management data;

receive the storage destination from the web server; and process the management data stored in the received storage destination, wherein, in a case where the valid period set for the authentication information included in the connection information expires, the access by the external device for storing the management data based on the connection information fails.

2. The management system according to claim 1, wherein the instructions stored in the first memory further cause the web server to acquire information indicating a type of the external device based on a content of the received acquisition request, wherein the storage destination included in the connection information is determined by using the acquired information indicating the type of the external device, and wherein types of the external devices include a network device, a monitoring device for monitoring operational statuses of one or more network devices, and an external server for storing management data of the one or more network devices by using a storage different from the storage system.

3. The management system according to claim 2, wherein the acquired information indicating a type of the external device is identified by using authentication information included in the acquisition request received from the external device.

4. The management system according to claim 1, wherein, in a case where management data transmitted from the external device is first type data to be transmitted to the storage system without passing through the web server, the acquisition request of the connection information is transmitted from the external device to the web server, and wherein, in a case where management data transmitted from the external device is second type data different from the first type data, the external device transmits the second type data as the management data to the web server without transmitting the acquisition request of the connection information.

5. The management system according to claim 1, wherein the instructions stored in the first memory further cause the web server to:

determine whether the external device should transmit management data to the web server or the storage system in a case where the acquisition request of the connection information is received, transmit a response including information indicating the web server in a case where it is determined that the management data should be transmitted to the web server, and wherein the created connection information is transmitted in a case where it is determined that the management data should be transmitted to the storage system.

6. The management system according to claim 1, wherein the valid period of the authentication information is specified according to a type of the management data corresponding to the acquisition request.

7. The management system according to claim 1, wherein the instructions stored in the first memory further cause the web server to manage time at which the external device stores management data in the storage system, wherein the valid period included in the connection information is specified based on the managed time.

8. The management system according to claim 1, wherein the instructions stored in the first memory further cause the web server to:

in a case where the storage result indicates a failure, create new connection information in which a valid period longer than the valid period specified when the connection information is created, and transmit a response including the new connection information in response to the result notification.

9. The management system according to claim 1, wherein the instructions stored in the first memory further cause the web server to:

in a case where the storage result indicates a failure, transmit a response including information indicating the web server as a transmission destination of the management data in response to the result notification.

10. The management system according to claim 1, wherein the management data is transferred to the application server after executing processing according to the received management data.

11. The management system according to claim 1, wherein the web server includes one or more virtual machines operated by one or more server computers.

12. A control method of a management system including a web server configured to communicate with a plurality of external devices storing management data of one or more network devices, and an application server configured to process management data stored in a storage system capable of storing data and management data transferred from the web server, a control method of the web server comprising:

transferring the management data to the application server in response to the reception of the management data from each of the external devices;

receiving an acquisition request of connection information used for transmission of the management data from each of the external devices;

creating connection information including information indicating a storage destination in the storage system and authentication information for allowing the external device to access the storage system, wherein, for the authentication information, a valid period is set; and transmitting a response including the created connection information in response to the acquisition request;

receiving, from the external device, a result notification about a storage result of management data by using the connection information;

transmitting, according to the reception of the result notification, the storage destination included in the connection information to the application server, and a control method of the application server comprising:

processing the transferred management data;

receiving the storage destination from the web server; and processing the management data stored in the received storage destination, wherein, in a case where the valid period set for the authentication information included in the connection information expires, the access by the external device for storing the management data based on the connection information fails.

13. A non-transitory computer-readable storage medium storing a program for causing a computer to execute a control method of a web server, the control method comprising:

transferring the management data to an application server in response to the reception of the management data from each of the external devices;

receiving an acquisition request of connection information used for transmission of the management data from each of the external devices;

creating connection information including information indicating a storage destination in the storage system and authentication information for allowing the external device to access the storage system, wherein, for the authentication information, a valid period is set;

transmitting a response including the created connection information in response to the acquisition request;

receiving, from the external device, a result notification about a storage result of management data by using the connection information; and transmitting, according to the reception of the result notification, the storage destination included in the connection information to the application server;

wherein the application server is configured to process the transferred management data and the management data stored in the storage destination received from the web server, and wherein, in a case where the valid period set for the authentication information included in the connection information expires, the access by the external device for storing the management data based on the connection information fails.

* * * * *